Patented June 18, 1946

2,402,136

UNITED STATES PATENT OFFICE 2,402,136

PROCESS FOR POLYMERIZATION OF ETHYLENE WITH OTHER POLYMERIZABLE SUBSTANCES

William E. Hanford, Wilmington, and John R. Roland, McDaniel Heights, Del., assignors to E. I. du Pont de Nemours & Company, Wilmington, Del., a corporation of Delaware No Drawing. Application November 12, 1941, Serial No. 418,674

17 Claims. (Cl. 260—86)

This invention relates to new polymeric materials and more specifically to polymers of N-vinyl derivatives of secondary amides with ethylene and to processes for their preparation.

It is an object of this invention to provide processes for making new polymers of N-vinyl derivatives of secondary amides with ethylene alone or with ethylene together with other polymerizable organic compounds.

It is a more specific object of this invention to provide processes for making new polymers of ethylene with N-vinyl-phthalimide.

Other objects and advantages of the invention will be apparent from the following specification.

According to this invention new polymeric materials are produced by heating N-vinyl derivatives of secondary amides with ethylene alone or together with another polymerizable organic compound in the presence of a polymerization-favoring catalyst at superatmospheric pressures. The following general procedure illustrates one method of practicing this invention which may be operated batch-wise, semi-continuously, or continuously.

A pressure-resistant reaction vessel is charged with a polymerization catalyst and an N-vinyl derivative of a secondary amide. If desired, water or an organic liquid solvent, or both, may be included in the charge. The vessel is then closed, placed in a heated shaker machine and connected to a source of ethylene. Controlling and recording thermocouples are inserted, ethylene is added to the reaction vessel and heating and agitation are started. Upon reaching the reaction temperature, or after a period of induction, the reaction starts and is normally followed by a pressure decrease due to the utilization of ethylene. The pressure is maintained throughout the reaction by the addition of fresh ethylene or the N-vinyl derivative of a secondary amide or a mixture of the two, or by decreasing the free space in the reaction vessel by increasing the volume of the menstruum.

When the reaction is complete, as evidenced by cessation of absorption of ethylene, the vessel is cooled, bled of excess ethylene, opened, and the reaction mixture discharged. The polymer is isolated from this reaction mixture by means known to the art. A further modification of the invention, as indicated in the previous general statement of the invention, includes the polymerization of a third polymerizable organic compound with the N-vinyl derivative of a secondary amide and ethylene. This third material may be added with the catalyst and N-vinyl derivative of a secondary amide or, if it is a gas at normal temperature and pressure, it may be expanded from pressure storage tanks into the closed reaction vessel prior to pressuring with ethylene.

The nitrogen valences of the N-vinyl derivatives of secondary amides used in the practice of this invention are attached to carbon and include not only those in which only one valence is attached to an acyl group but also those wherein two valences are so attached as in the imides of dicarboxylic acids or in diacyl imides. Suitable examples of such N-vinyl derivatives of secondary amides are N-vinylphthalimide, N-vinylsuccinimide, N-vinyldiglycolimide, the N-vinylimide of naphthalene-1, 8-dicarboxylic acid, the N-vinylimide of naphthalene-1,2-dicarboxylic acid and the like. N-vinyl derivatives of secondary amides, such as are employed in the present invention, are suitably prepared by the process of U. S. Patent 2,231,905.

The conditions employed in the practice of this invention may vary over a wide range. Thus, the polymerization may be effected by heating the reaction mixture at from 40° to 350° C., generally at from 50 to 250° C. and preferably at from 50 to 150° C.

The reaction is carried out under a superatmospheric pressure and generally at pressures in the range of from 5 to 1500 atmospheres or higher and preferably in the range of from 200 to 1000 atmospheres. The upper limit of pressure which can be used is dictated by the strength of available equipment.

The polymerization may be carried out in a menstruum which may consist solely of water, or an organic solvent, or of an organic solvent and water. Suitable organic solvents are saturated aliphatic hydrocarbons, aromatic hydrocarbons, ethers, ketones, esters, and substituted amides. Specific examples of such preferred solvents are isooctane, toluene, benzene, cyclohexane, ether, cyclohexanone, butyl acetate, dioxane, and N,N-dimethylformamide. In operating in an aqueous medium it is not necessary to use surface active agents but the addition of such substances may sometimes be desirable. Suitable examples are starch, the water soluble salts of the higher alkyl sulfates and alkane sulfonates, alkali metal salts of sulfonated mineral oils, and such non-ionic water soluble compounds as are obtained by the condensation of several moles of ethylene oxide with long chain amides, alcohols or acids.

Catalysts suitable for the operation of this invention are hydrogen peroxide and those per compounds which are formed by the action of hydrogen peroxide on ordinary acids or which may be readily converted to hydrogen peroxide on treatment with dilute sulfuric acid. Suitable examples of such compounds include hydrogen peroxide, benzoyl peroxide, acetyl peroxide, higher diacyl peroxides, e. g., lauroyl peroxide, acetyl benzoyl peroxide, tetralin peroxide, peracetic acid, alkali metal and ammonium persulfates, perborates and percarbonates. These catalysts are defined in Webster's International Dictionary as "per-oxy" compounds containing, as they do, the group —O—O—. There can be used combinations of these catalysts as well as combinations of persulfates such as sodium or potassium persulfates with selected buffering agents such as alkali metal phosphates which may be produced by adding sodium hydroxide to phosphoric acid until a pH of about 9 is obtained. Tetraethyllead and other organometallic compounds which give free radicals on thermal decomposition are also operative as catalysts in this process as is also molecular oxygen at temperatures above 125° C. The amount of catalyst used may vary over a wide range but generally speaking it is of the order of 0.1% or more based on the weight of the total polymerizable monomers. As much as 5 to 10% of catalyst, based on the total polymerizable monomers, may be employed but it is generally desirable to use less than this since with large amounts of catalysts the molecular weight of the product is usually low.

The following examples illustrate the practice of this invention and demonstrate operable conditions. Parts are given by weight unless otherwise specified.

*Example 1*

An aluminum-lined reaction vessel is charged with 80 parts of water, 80 parts of isooctane, 20 parts of N-vinylphthalimide, 2 parts of a 65% solution of the sodium salt of sulfated 9,10-octadecenyl acetate and 0.2 part of benzoyl peroxide. The pH of this mixture is 3.5. The vessel is then closed, pressured with ethylene, and heating and agitation are started. During a reaction time of 15 hours, throughout which the temperature is maintained at 93 to 96° C., and the pressure at 860 to 955 atmospheres, the total observed pressure drop is 70 atmospheres. The vessel is then cooled, bled of excess ethylene, opened and the contents discharged. This reaction mixture has a pH of 3.6. The isooctane is separated by steam distillation and unreacted N-vinylphthalimide recovered by solution in alcohol. There is thus obtained 5 parts of a brown plastic polymer.

*Example 2*

An aluminum-lined steel reaction vessel is charged with 130 parts of isooctane, 20 parts of N-vinylphthalimide, and 0.4 part of benzoyl peroxide. The reaction is carried out as in Example 1 except that the temperature is maintained at 117° to 120° C. This yields 8 parts of a tough brown plastic. This polymer contains 4.92% nitrogen from which it may be calculated that the ethylene N-vinylphthalimide mole ration is 4:1.

*Example 3*

A stainless steel lined reaction vessel is charged with 40 parts of N-vinylsuccinimide, 100 parts of isooctane, and 0.2 part of benzoyl peroxide. The vessel is closed, pressured with ethylene, and heating and agitation started. During the reaction time of 17.25 hours, throughout which the temperature is maintained at 85° to 93° C. and the pressure at 670 to 940 atmospheres, the total observed pressure drop is 405 atmospheres. The vessel is then cooled, bled of excess ethylene, opened and the contents discharged. The reaction product is treated with about 500 cc. of alcohol to extract monomeric N-vinylsuccinimide. The hot solution is filtered and the polymer dried at 70° C. There is thus obtained 45 parts of a white polymer which contains 6.5% nitrogen. From this analysis it is calculated that the polymer contains 57.6% by weight of N-vinylsuccinimide and that the ethylene/N-vinylsuccinimide mole ratio is 3.3:1. The polymer can be molded at 125° C. to clear, water-white, stiff films.

The above experiment is repeated, except that the N-vinylsuccinimide is reduced to 10 parts. During the reaction time of 17.5 hours, throughout which the temperature is maintained at 88° to 93° C., and the pressure at 830 to 950 atmospheres, the total observed pressure drop is 460 atmospheres. The product, isolated as in the preceding experiment, amounts to 60 parts of a white powder which contains 1.9% nitrogen. From this analysis it may be calculated that the polymer contains 17.1% by weight of N-vinylsuccinimide and that the ethylene/N-vinylsuccinimide ratio is 22:1. This polymer can be molded at 125° C. to give a clear, white, tough film.

The ethylene used in the practice of this invention should be of good purity but may contain small proportions of methane, ethane, propane, nitrogen, hydrogen, carbon dioxide or oxygen. The tolerable amount of contaminant varies greatly and depends on the nature of the contaminant. Since the effect of the oxygen is generally deleterious, its concentration in the ethylene should be kept as low as practical.

The reaction is preferably carried out in equipment fabricated of or lined with materials which do not rapidly catalyze the decomposition of peroxides to molecular oxygen. Suitable examples of such materials are stainless steels, silver, aluminum, tin, lead, enamel and glass.

When operating the invention in an aqueous medium, the pH of the reaction medium affects the rate and extent of polymerization. The most suitable pH range is dependent on the catalyst employed and on the polymerization components of the system. Benzoyl peroxide for example is most effective at a pH in the range from about 1.0 to 4.0 while persulfates are most effective at a pH above 7.0 and preferably in the range from 9.0 to 12.0. In the present invention the pH may be adjusted or maintained by the use of buffer salts such as potassium dihydrogen phosphate, sodium acetate, sodium carbonate, sodium tetraborate and the like and/or by the addition of acid or alkali such as hydrochloric, hydrobromic, sulfuric, and formic acid and sodium and potassium hydroxide.

The properties of the polymers can be varied by varying the ratio of the N-vinyl derivative of a secondary amide to ethylene. In general, the use of ratios of ethylene to N-vinyl derivative of a secondary amide lower than 1:50 do not bring about significant modification in the properties of the N-vinyl derivative of a secondary amide. It is generally preferred to use ratios of ethylene to the N-vinyl derivative of a secondary amide of at least 1:10.

The properties of the polymers can also be varied by including in the reaction mixture another polymerizable organic compound, other than the N-vinyl derivative of a secondary amide. Examples of such compounds include vinyl esters, ethers and ketones such as vinyl chloride, vinyl acetate, vinyl propionate, vinyl benzoate, vinyl chloracetate, vinyl methyl ether, vinyl ethyl ether, vinyl butyl ether, vinyl phenyl ether, vinyl methyl ketone, vinyl ethyl ketone and the like; chloroalkenes such as vinylidene chloride, 2-chloropropene-1, trichloroethylene, 2-chloro-1,3-butadiene; esters, amides and nitriles of acrylic and methacrylic acids such as methyl, ethyl, propyl, and butyl acrylates and methacrylates, acrylamide, methacrylamide, N-alkyl and N,N-dialkyl acrylamides and methacrylamides, acrylonitrile and methacrylonitrile; esters, amides and nitriles of fumaric, maleic, itaconic, and citraconic acids, such as dimethyl and diethyl fumarates, maleates, itaconates and citraconates and the like, fumaramide, maleamide, itaconamide, citraconamide, fumaronitrile, maleonitrile, itacononitrile, citracononitrile; unsaturated hydrocarbons such as propylene, isobutylene, camphene, methylenecyclohexane, octene-1, higher alkene-1's, butadiene, isoprene and the like.

If the reaction is carried out in an emulsion system, a wide variety of dispersants may be used. The preferred dispersants are the water soluble salts of long chain aliphatic sulfates and alkane sulfonates, sulfonated and sulfated mineral oils, Turkey red oil and the like. Water soluble starches or the condensation products of several moles of ethylene oxide with long chain amines, alcohols, or acids are also suitably used in this invention.

For rapid polymerization it is desirable to provide intimate contact between all the reactants by agitation. By the term "agitation" as used herein, it is meant any means accomplishing intimate contact between the reactants, e. g., rapid stirring, turbulence in a continuous process, atomization, shaking, or bubbling of the gas or gases through the liquid phase.

Various changes may be made in the details and preferred embodiments of this invention without departing therefrom or sacrificing the advantages thereof.

We claim:

1. A polymer of an N-vinylphthalimide and ethylene.

2. A process for producing polymers of ethylene and an N-vinyl derivative of a secondary amide which comprises heating ethylene and an N-vinyl derivative of a secondary amide, in the presence of a per-oxy compound catalyst, at a temperature of 50 to 250° C., and at a pressure in excess of 5 atmospheres, the ethylene and amide being employed in a ratio no lower than 1:50, respectively, said N-vinyl derivative being a member of the class consisting of the N-vinyl secondary amides of saturated aliphatic dicarboxylic acids and N-vinyl secondary amides of aromatic dicarboxylic acids, in which the amido-nitrogen is attached directly to a vinyl group.

3. A process for producing polymers of ethylene and an N-vinyl derivative of a secondary amide which comprises heating ethylene and an N-vinyl derivative of a secondary amide, in the presence of a per-oxy compound catalyst, at a temperature of 50 to 150° C., and at a pressure in excess of 5 atmospheres, the ethylene and amide being employed in a ratio no lower than 1:50, respectively, said N-vinyl derivative being a member of the class consisting of the N-vinyl secondary amides of saturated aliphatic dicarboxylic acids and N-vinyl secondary amides of aromatic dicarboxylic acids, in which the amido-nitrogen is attached directly to a vinyl group.

4. A process for producing polymers of ethylene and an N-vinyl derivative of a secondary amide which comprises heating ethylene and an N-vinyl derivative of a secondary amide, in the presence of a per-oxy compound catalyst, at a pressure in excess of 5 atmospheres and at a temperature in the range of from 40 to 350° C., the ethylene and amide being employed in a ratio no lower than 1:50, respectively, said N-vinyl derivative being a member of the class consisting of the N-vinyl secondary amides of saturated aliphatic dicarboxylic acids and N-vinyl secondary amides of aromatic dicarboxylic acids, in which the amido-nitrogen is attached directly to a vinyl group.

5. A process for producing polymers of ethylene and an N-vinyl derivative of a secondary amide which comprises heating ethylene and an N-vinyl derivative of a secondary amide, in the presence of a per-oxy compound catalyst, at a pressure of from 50 to 1500 atmospheres and at a temperature in the range of from 40 to 350° C., the ethylene and amide being employed in a ratio no lower than 1:50, respectively, said N-vinyl derivative being a member of the class consisting of the N-vinyl secondary amides of saturated aliphatic dicarboxylic acids and N-vinyl secondary amides of aromatic dicarboxylic acids, in which the amido-nitrogen is attached directly to a vinyl group.

6. A process for producing polymers of ethylene and an N-vinyl derivative of a secondary amide which comprises heating ethylene and an N-vinyl derivative of a secondary amide, in the presence of a per-oxy compound catalyst, at a pressure of from 200 to 1000 atmospheres and at a temperature in the range of from 40 to 350° C., the ethylene and amide being employed in a ratio no lower than 1:50, respectively, said N-vinyl derivative being a member of the class consisting of the N-vinyl secondary amides of saturated aliphatic dicarboxylic acids and N-vinyl secondary amides of aromatic dicarboxylic acids, in which the amido-nitrogen is attached directly to a vinyl group.

7. A process for producing polymers of ethylene and an N-vinyl derivative of a secondary amide which comprises heating ethylene and an N-vinyl derivative of a secondary amide, in the presence of an organic peroxide compound, at a pressure of from 50 to 1500 atmospheres and at a temperature in the range of from 40 to 350° C., the ethylene and amide being employed in a ratio no lower than 1:50, respectively, said N-vinyl derivative being a member of the class consisting of the N-vinyl secondary amides of saturated aliphatic dicarboxylic acids and N-vinyl secondary amides of aromatic dicarboxylic acids, in which the amido-nitrogen is attached directly to a vinyl group.

8. A process for producing polymers of ethylene and an N-vinyl derivative of a secondary amide which comprises heating ethylene and an N-vinyl derivative of a secondary amide, in the presence of a per-oxy compound catalyst, at a pH of 1 to 4, at a temperature of 40 to 350° C., at a pressure in excess of 5 atmospheres, and the ethylene and amide being employed in a ratio no lower than 1:50, respectively, said N-vinyl derivative being a member of the class consisting of the N-vinyl secondary amides of saturated aliphatic dicarboxylic acids and N-vinyl secondary amides of aromatic dicarboxylic acids, in which the amido-nitrogen is attached directly to a vinyl group.

9. A process for producing polymers of ethylene and an N-vinyl derivative of a secondary amide which comprises heating ethylene and an N-vinyl derivative of a secondary amide, in the presence of a per-oxy compound catalyst, at a pH of 1 to 4, at a temperature of 50 to 150° C., at a pressure of 200 to 1000 atmospheres, and the ethylene and amide being employed in a ratio no lower than 1:50, respectively, said N-vinyl derivative being a member of the class consisting of the N-vinyl secondary amides of saturated aliphatic dicarboxylic acids and N-vinyl secondary amides of aromatic dicarboxylic acids, in which the amido-nitrogen is attached directly to a vinyl group.

10. A process for producing polymers of ethylene and an N-vinyl derivative of a secondary amide which comprises heating ethylene and an N-vinyl derivative of a secondary amide, in the presence of an organic peroxide compound, at a temperature of 40 to 350° C., and at a pressure in excess of 5 atmospheres, the ethylene and amide being employed in a ratio no lower than 1:50, respectively, said N-vinyl derivative being a member of the class consisting of the N-vinyl secondary amides of saturated aliphatic dicarboxylic acids and N-vinyl secondary amides of aromatic dicarboxylic acids, in which the amido-nitrogen is attached directly to a vinyl group.

11. A process for producing polymers of ethylene and an N-vinyl derivative of a secondary amide which comprises heating ethylene and an N-vinyl derivative of a secondary amide, in the presence of benzoyl peroxide, at a temperature of 40 to 250° C. and at a pressure in excess of 5 atmospheres, the ethylene and amide being employed in a ratio no lower than 1:50, respectively, said N-vinyl derivative being a member of the class consisting of the N-vinyl secondary amides of saturated aliphatic dicarboxylic acids and N-vinyl secondary amides of aromatic dicarboxylic acids, in which the amido-nitrogen is attached directly to a vinyl group.

12. A process for producing polymers of ethylene and an N-vinyl derivative of a secondary amide which comprises heating ethylene and an N-vinyl derivative of a secondary amide, in the presence of an organic peroxide compound, at a temperature of 50 to 150° C., at a pressure of 200 to 1000 atmospheres, the ethylene and amide being employed in a ratio no lower than 1:50, respectively, said N-vinyl derivative being a member of the class consisting of the N-vinyl secondary amides of saturated aliphatic dicarboxylic acids and N-vinyl secondary amides of aromatic dicarboxylic acids, in which the amido-nitrogen is attached directly to a vinyl group.

13. A process for producing polymers of ethylene and an N-vinyl derivative of a secondary amide which comprises heating ethylene and an N-vinyl derivative of a secondary amide, in the presence of benzoyl peroxide, at a temperature of 50 to 150° C., at a pressure of 200 to 1000 atmospheres, the ethylene and amide being employed in a ratio no lower than 1:50, respectively, said N-vinyl derivative being a member of the class consisting of the N-vinyl secondary amides of saturated aliphatic dicarboxylic acids and N-vinyl secondary amides of aromatic dicarboxylic acids, in which the amido-nitrogen is attached directly to a vinyl group.

14. A process for producing polymers of ethylene and an N-vinyl derivative of a secondary amide which comprises heating ethylene and an N-vinyl derivative of a secondary amide, in an aqueous medium, in the presence of a per-oxy compound catalyst, at a temperature of 40 to 350° C., at a pressure in excess of 5 atmospheres, the ethylene and amide being employed in a ratio no lower than 1:50, respectively, said N-vinyl derivative being a member of the class consisting of the N-vinyl secondary amides of saturated aliphatic dicarboxylic acids and N-vinyl secondary amides of aromatic dicarboxylic acids, in which the amido-nitrogen is attached directly to a vinyl group.

15. A process for producing polymers of ethylene and an N-vinyl derivative of a secondary amide which comprises heating ethylene and an N-vinyl derivative of a secondary amide, in an aqueous medium, in the presence of benzoyl peroxide, at a temperature of 50 to 150° C., at a pressure of from 200 to 1000 atmospheres, the ethylene and amide being employed in a ratio no lower than 1:50, respectively, said N-vinyl derivative being a member of the class consisting of the N-vinyl secondary amides of saturated aliphatic dicarboxylic acids and N-vinyl secondary amides of aromatic dicarboxylic acids, in which the amido-nitrogen is attached directly to a vinyl group.

16. A process for producing polymers of ethylene and an N-vinyl phthalimide in the presence of a per-oxy compound catalyst, the ethylene and amide being employed in a ratio no lower than 1:50, respectively, at a pressure in excess of 5 atmospheres and at a temperature in the range of from 40 to 350° C.

17. A process for producing polymers of ethylene and an N-vinyl phthalimide which comprises heating ethylene and an N-vinyl phthalimide in the presence of benzoyl peroxide, at a temperature of 40 to 350° C., at a pressure in excess of 5 atmospheres, the ethylene and amide being employed in a ratio no lower than 1:50, respectively.

WILLIAM E. HANFORD.
JOHN R. ROLAND.

Certificate of Correction

Patent No. 2,402,136.

June 18, 1946.

WILLIAM E. HANFORD ET AL.

It is hereby certified that errors appear in the printed specification of the above numbered patent requiring correction as follows: Column 2, line 55, for "amides" read *amines*; column 7, line 38, claim 11, for "250° C." read *350° C.*; and that the said Letters Patent should be read with these corrections therein that the same may conform to the record of the case in the Patent Office.

Signed and sealed this 3rd day of September, A. D. 1946.

[SEAL]

LESLIE FRAZER,
*First Assistant Commissioner of Patents.*